July 7, 1936.  P. DRAKE ET AL  2,046,370

FISHHOOK HOLDER AND GUARD

Filed July 9, 1935

INVENTORS
Percell Drake
Festus Hairston
BY Claude Wadsworth
ATTORNEY.

Patented July 7, 1936

2,046,370

UNITED STATES PATENT OFFICE 2,046,370

FISHHOOK HOLDER AND GUARD

Percell Drake and Festus Hairston, Detroit, Mich.

Application July 9, 1935, Serial No. 30,488

5 Claims. (Cl. 43—38)

This invention relates to means for securing fish-hooks and to mechanical means for preventing them from catching on rocks, sunken logs, or other under-water obstructions and from being fouled or choked by the grass or other vegetation with which unprotected hooks often become entangled when drop lines are lifted upward in weedy waters or throw lines are drawn over rough lake or river bottoms.

While the chief object of the present invention is to provide an effective guard against fouling without lessening the fish-catching effectiveness of the hook, prevention of line breakage and loss of hooks are other objects achieved thereby. Another object of the invention is to combine with the hook-guarding means a simple hook holding and fastening, or locking, means providing for easy detachment and replacement of the hook.

As constructive features and operation of the invention are hereinafter described other objects will become evident, but since the means of attaining them may be varied considerably without departing from the spirit and scope of the appended claims, the inventors declare that the invention does not lie wholly within the purely physical limits of the disclosure herein presented.

In the accompanying drawing illustrating constructional features of the invention Figure 1 is a left-side view showing a swingable open-loop type of hook-guarding member in its normal non-guarding, or open, position, the dotted lines indicating the position that the guard would be forced to assume as a result of contacting some obstruction;

Figure 3:
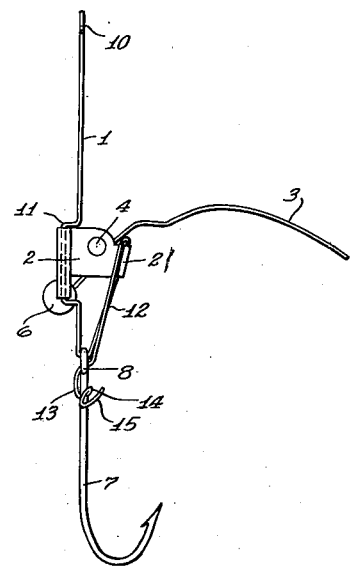
Fig. 3 is a right-side view, being opposite to that shown in Fig. 1.
Figure 4:
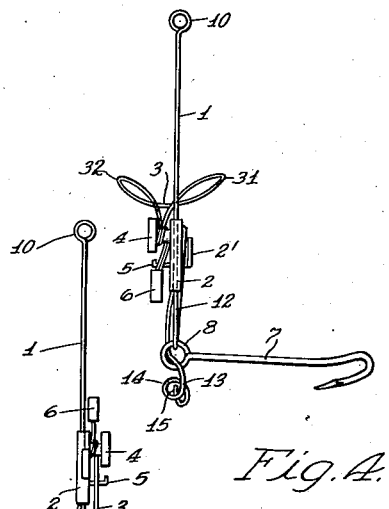
Fig. 4 is a rear view corresponding to Fig. 2 but showing the hook pulled out from between the holding-member coils that serve to clamp, or lock, it in its normal position, as shown by Figs. 1 to 3 inclusive.
Figure 5:
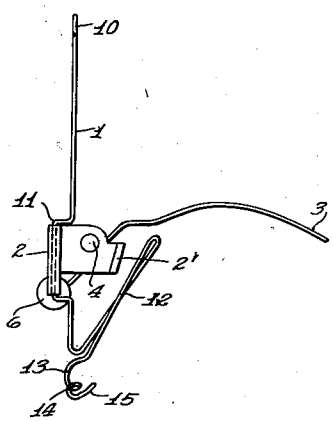
Figure 6:
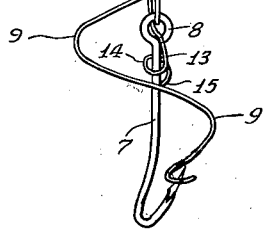

Fig. 5 is a right-side view corresponding to Fig. 3, but without hook, showing the latching, or locking, element of the hook-holding member out of its normal position within the catch of the swiveling member that serves to support the hook-guarding member; and Fig. 6 is a front view showing a non-looped type of hook-guarding member in its closed, or hook-protecting, position, as brought about by contact with under-water vegetation or other obstruction, the guard having a reversed curvilinear configuration to give the same sidewise protection as is furnished by the open-loop type of guard. Both types, which represent forms capable of wide variation in structure and outline, are adapted to override under-water obstructions, thereby eliminating line breakages and hook losses, each type serving also to interpose an effective barrier against clogging of the hook by warding off the grass or weeds that unguarded hooks pick up.

Figure 1:
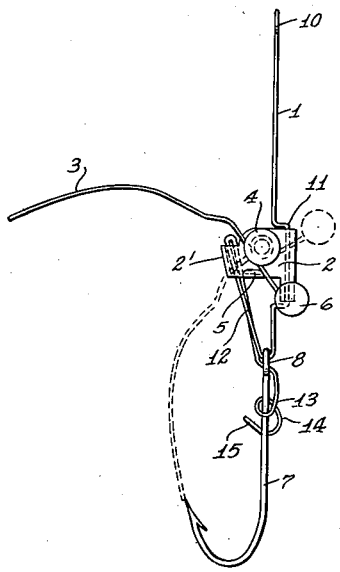

In all views like reference numerals designate the same parts, 1 indicating a combined hook-holding and fastening, or locking, member having an offset portion 11 where there is located a hinge-like swingable support member 2 carrying a hook-guarding member 3 wound around and turnable on the outwardly flanged pin 4, a stop 5 being provided to limit the swinging movement of the guard 3, which is held in its normal upper, or open, non-guarding position by the force of gravity, a weight 6 being attached to one end of the guard member, which is forced to assume its closed, or hook-guarding, position, as shown by dotted lines in Fig. 1, whenever weeds or other lake or river-bottom obstructions are encountered, the obstructive pressure set up when the line is pulled inwardly serving to close the normally-existing gap between the guard and the hook, thereby preventing the catching or fouling of the hook, the pull of gravity on weight 6 snapping the guard back into normal, or open, position whenever the closing pressure thereon is released, as on passing by the obstruction.

Figure 2:
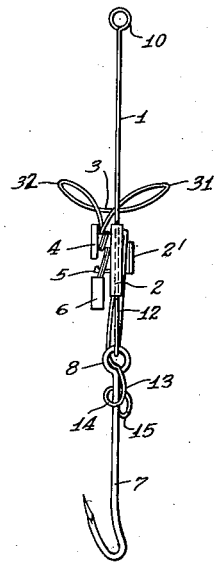
Fig. 2 is a rear view showing the hook-guarding member in its normal, or open, position.

On reference to Figs. 1 to 3 inclusive and Fig. 5 it will be noted that forwardly, as well as laterally to right and left, the guard member 3, whether of loop or non-loop type, is given a configuration such as to cause the hook to ride over obstructions and push away from the hook any under-water vegetation through which it may be drawn while the guard is held in closed position to prevent catching or fouling of the hook, the curvilinear projections $3^1$ and $3^2$ and 9, Fig. 6, serving as runners to facilitate passage of hook over obstructions when the hook occupies a flatwise, or sidewise, position.

When the hook-guarding member 3 is in its closed, or protective, position, as indicated by dotted lines in Fig. 1 and by Fig. 6, the lower end thereof is in contact with the hook somewhat below its point, and not far from the supporting pin 4 it simultaneously makes contact with the stop element 5 of the support member 2. By thus supporting the guarding member it becomes capable of effectively resisting a heavy pull on the line whenever release from hook-fouling matter or some under-water obstruction is necessary.

In order that it may swing freely, the hook-guarding member 3 is loosely mounted on the outwardly flanged pivot pin 4 on which it turns, and since the space between the support member 2 and flange of pin 4 is sufficiently wide to eliminate any sidewise resistance to the swinging movement of the guard member, crosswise variation in point of contact between hook and guard when the latter is in closed, or hook-protecting, position is automatically provided for by the open-loop type of guard shown in Figs. 1 to 5. With the non-loop type of guard shown in Fig. 6, however, it is necessary to make a short crosswise bend at the end of the guard in front of the hook to compensate for sidewise variation in point of contact between hook and guard so as to insure adequate support for the latter regardless of any shifting of point of hook contact due to looseness of guard mounting provided to assure perfect freedom of action thereof. A light flat piece of metal fastened to the end of the non-loop type of guard would serve equally well as a means of compensating for sidewise shifting of point of contact between guard and hook, thereby insuring adequate support for the guard when subjected to a stress that might otherwise cause it to pass the point of the hook and thus destroy its effectiveness as a means of protecting the hook against fouling or catching on some obstruction.

The hook-holding and locking member broadly designated by the numeral 1 applied to the upper portion thereof is a continuous-wire structure formed with an eye 10 to which the fishline is fastened. At the point where the hook-guard support member 2 is applied there is an offset portion 11 on which the hook-guard support member is swingable horizontally, and below the offset portion the wire is bent back upon itself to form a closed loop 12 that serves as a hanger for the fish-hook 7, the eye 8 of which is slipped over the loop 12, which is turned upwardly and outwardly to make it serve also as a spring-type latching element adapted to be received and detachably held or locked within the catch $2^1$ formed in the support member 2.

The offset formed in the combined hook-holding and locking member 1 prevents upward or downward shifting of the hinge-type guard-supporting member 2, which is swingable horizontally toward and away from the angularly-positioned closely-spaced, or closed, loop 12, the backwardly-curved forward end $2^1$ of the supporting member 2 serving as a catch wherein to spring and lock the loop, over which the eye end of the hook has been slipped, as indicated by Figs. 1 to 4 inclusive.

Below the point where the eye 8 of hook 7 is held on closed loop 12 the combined hook-holding and locking member has two coils 13 and 14, one on each side of the hook shank 7 which, when pressed between the two coils after the eye 8 is slipped over the loop 12 is securely locked in place, the pressure exerted by the coils, which are "pinched in" at the entering side of the space between them, being sufficient to prevent the hook shank 7 from coming out of the space between the coils, the end 15 of the lower one of the coils being extended slightly to facilitate spreading of the coils apart in order to release the hook shank 7 to permit removal of the hook, the eye 8 of which is slipped over the closed loop 12 after the latter is released from the catch $2^1$ of the hook-guarding member support 2, as indicated by Fig. 5.

Where the closed loop 12 passes through the eye 8 it is spread sufficiently to grip the hook tightly enough to prevent up and down movement thereof, and coils 13 and 14, between which the hook shank 7 is pressed after being passed over the loop 12, prevent the hook from slipping on the loop, removal of the hook being made possible by releasing the loop from the catch $2^1$ of the guard-supporting member 2, as shown in Fig. 5, and swinging the support member 2 out of the way.

Having described our invention in a manner to make it understood by persons familiar with the art to which it relates, we claim:

1. Fish-hook holding and guarding means comprising a holding member embodying hook-gripping and locking means, a supporting and catch-carrying member swingably attached to said holding member, and a hook-guarding member pivotally attached to said supporting member, said hook-guarding member normally being held away from the hook by gravity and being brought into hook-guarding position when the force of gravity is overcome by a pull on the line due to resistance arising from contact of the guarding member with something that ordinarily would foul or catch the hook, said supporting member having a stop limiting the swinging movement of said hook-guarding member.

2. A fish-hook holding and guarding device comprising a member adapted to receive and detachably hold a hook, a support member swingably attached to said first-named member and detachably held in non-swingable relation thereto by fastening means carried by said support member, a movable weighted hook-guarding member pivotally attached to said support member and normally held in open non-guarding position by gravity, swinging into hook-protecting position only when contact with some obstruction on which the hook might catch or be fouled overcomes the force of gravity, and a stop on said support member limiting the swinging movement of said hook-guarding member.

3. A fish-hook holding and guarding device comprising a hook-holding and locking member carrying means permitting ready detachment and replacement of the hook, a hinge-like guard-carrying support member swingably attached to said hook-holding member, and a hook-guarding member swingably attached to said support member and carrying a weight normally holding it in non-guarding position, said guarding member being bent to give frontal and lateral configurations serving as means to ward off hook-fouling matter and permit the hook to ride over obstructions without catching thereon, contact with such matter and obstructions serving to overcome the force of gravity and throw said guarding member into hook-protecting position.

4. A fish-hook holder and guard comprising a combined hook-holding and fastening member, a guard-supporting and catch-carrying member swingably attached to said first-named member, and a movable hook-guarding member loosely mounted on a suitably flanged pivot pin carried by said support member, a weight attached to said guarding member normally holding it in non-guarding position, said combined hook-holding and fastening member being formed of a continuous piece of wire and having an offset portion accommodating said swingably-attached supporting and catch-carrying member and preventing slippage thereof, a portion formed as a closed, upwardly tilted, angularly-positioned loop serving as a hanger for the hook and as a spring-type locking latch adapted to be received and held by the catch of said guard-supporting member, and a portion having coils adapted to grip the shank of the hook rigidly and thus fasten it against movement.

5. A hook-holding and guarding device comprising a continuous wire bent in the formation of a hook-holding and fastening member, a hinge-like catch-and-stop-carrying support member swingably attached to said first-named member, and a movable hook-guarding member normally held in open non-guarding position by gravity, said hook-guarding member having a curvilinear configuration, both frontally and laterally, adapted to ward off hook-fouling matter and to ride over under-water obstructions, said guard being of a length such as to make contact with and be supported by hook whenever an obstruction-freeing pull on line throws the guard into hook-protecting position.

PERCELL DRAKE.
FESTUS HAIRSTON.